United States Patent [19]
Onan et al.

[11] Patent Number: 5,791,380
[45] Date of Patent: Aug. 11, 1998

[54] METHODS OF FORMING INSULATED PIPELINE BUNDLES

[75] Inventors: David D. Onan, Lawton; Ronald J. Crook, Duncan, both of Okla.

[73] Assignee: Halliburton Company, Duncan, Okla.

[21] Appl. No.: 570,845

[22] Filed: Dec. 12, 1995

[51] Int. Cl.$^6$ ........................ F16L 9/14
[52] U.S. Cl. ............ 138/149; 138/113; 138/98; 166/293; 264/269
[58] Field of Search ............ 138/112, 97, 98, 138/148, 149, 114, 113; 166/293; 264/269

[56] References Cited

U.S. PATENT DOCUMENTS

| | | | |
|---|---|---|---|
| 3,737,493 | 6/1973 | Hacker | 264/42 |
| 3,841,808 | 10/1974 | Hacker | 425/110 |
| 4,304,298 | 12/1981 | Sutton | 166/293 |
| 4,596,834 | 6/1986 | Widener et al. | 521/83 |
| 4,640,312 | 2/1987 | Patell et al. | 138/109 |
| 5,241,993 | 9/1993 | Stephens | 138/98 |
| 5,293,938 | 3/1994 | Onan et al. | 166/293 |
| 5,588,489 | 12/1996 | Chatterji et al. | 166/293 |

FOREIGN PATENT DOCUMENTS

| | | |
|---|---|---|
| 0177475 | 4/1986 | European Pat. Off. |
| 1115175 | 5/1968 | United Kingdom |
| 1381290 | 1/1975 | United Kingdom |
| 1431971 | 4/1976 | United Kingdom |
| WO 93/03234 | 2/1993 | WIPO |

*Primary Examiner*—Patrick F. Brinson
*Attorney, Agent, or Firm*—Craig W. Roddy; C. Clark Dougherty, Jr.

[57] ABSTRACT

Methods of forming highly insulated pipeline bundles made up of one or more flow lines positioned within a continuous larger diameter outer sleeve are provided. The methods basically comprise the steps of filling the space between the outside of the flow lines and the inside of the outer sleeve with a foamed cement composition comprised of hydraulic cement, water, a gas and a foaming agent, allowing the hydration reaction between the hydraulic cement and the water in the cement composition to take place, and then heating the hydrated cement composition to evaporate and remove excess water in the cement composition and thereby increase the insulating properties of the cement composition.

35 Claims, 1 Drawing Sheet

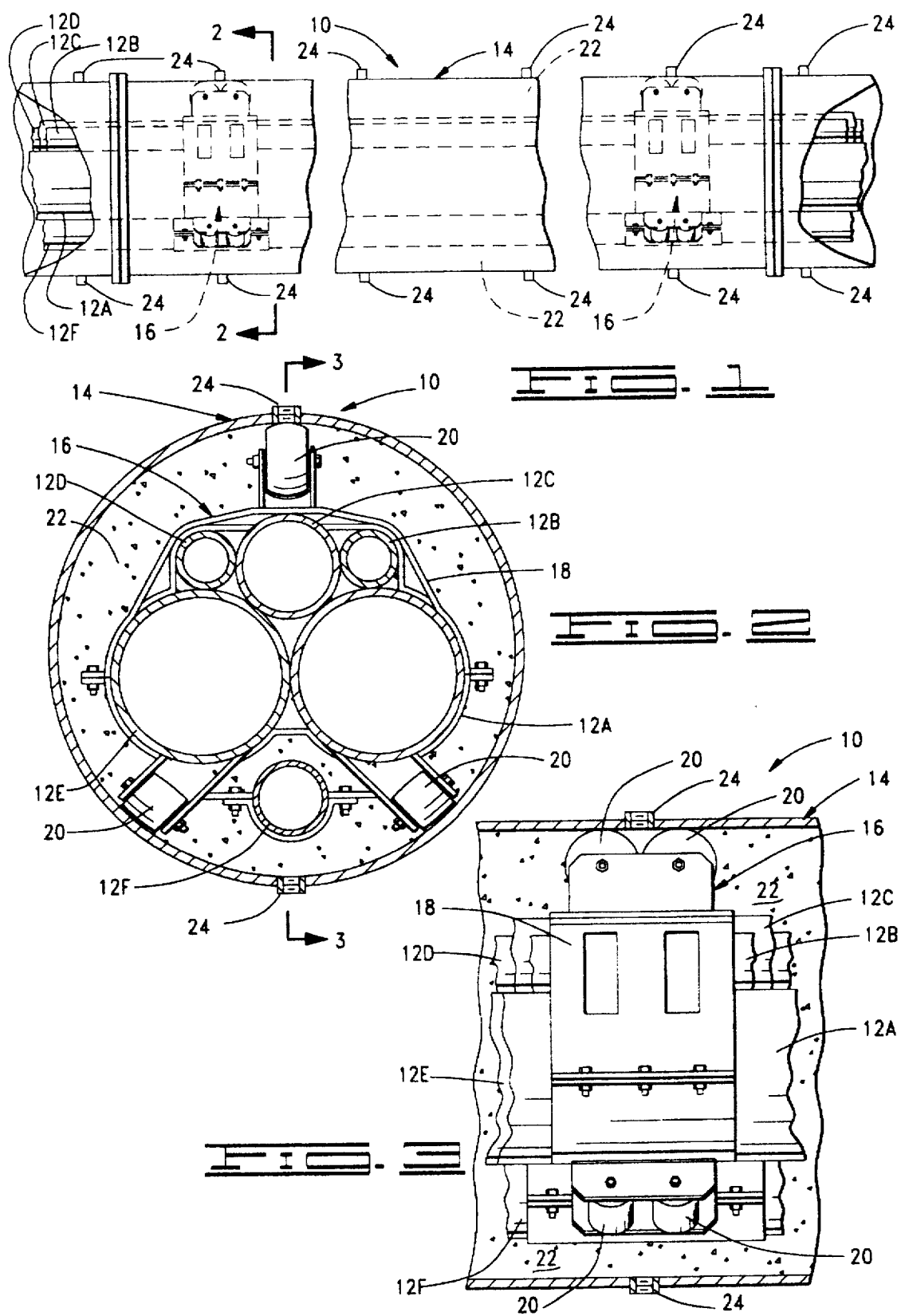

METHODS OF FORMING INSULATED PIPELINE BUNDLES

BACKGROUND OF THE INVENTION

1. Field of the Invention

The present invention relates to improved methods of forming highly insulated pipeline bundles of the type utilized to transport fluids such as oil and gas.

2. Description of the Prior Art

Insulated pipeline bundles made up of two or more pipelines, i.e., flow lines, positioned within a continuous larger diameter outer sleeve have been developed and used heretofore. Such pipeline bundles are particularly suitable for transporting fluids under water such as oil and gas produced from offshore wells. The pipeline bundles have heretofore been insulated by filling the space between the outside of the flow lines and the inside of the outer sleeve with insulating compositions including hydraulic cement compositions.

When hydraulic cement compositions are utilized, the set cement sheath between the flow lines and the outer sleeve in a typical pipeline bundle configuration will be subjected to various shear and compressional stresses during the life of the pipeline. The stresses in the pipeline bundle are defined as the force applied over an area resulting from a strain caused by the incremental change of a body's length or volume. Stress is generally related to strain by a proportionality constant known as Young's Modulus. Each type of material has a different Young's Modulus. In annular sealant configurations, i.e., when a set non-foamed cement is in the annulus between a pipe inside another pipe, the Young's Modulus for the cement is about $3 \times 10^6$ psi and for steel pipe about $30 \times 10^6$ lb. psi.

There can be several stress conditions associated with pipeline bundle installations. One such condition is the result of relatively high fluid pressures and/or temperatures inside the flow lines. A high internal pipe pressure and/or temperature results in the expansion of the pipe both radially and longitudinally which places stresses on the cement sheath causing it to crack or the bond between the outside surface of the pipe and the cement sheath to fail. Another condition results from exceedingly high pressures which occur inside the annular cement sheath due to thermal expansion of fluids trapped within the annulus. This condition often occurs as a result of high temperature differentials created during fluid production and transport combined with channels or pockets containing fluids, e.g., water, within the annulus created by poor displacement during cementing operations. Typically, the pressure of the trapped fluids exceeds the collapse pressure of one or more flow lines causing a leak or failure. Still another condition occurs as a result of the stresses exerted on the entire system during transport of the pipeline bundle (as in the case of land filling the bundle with cement followed by launch and tow operations) or the movement or shifting of the bundle on the sea floor.

While hydraulic cement compositions generally have good thermal insulating properties after setting, are environmentally safe and are corrosion resistant, there is a continuing need for improvement in the insulating properties of hydraulic cement compositions utilized in pipeline bundles to prevent condensation and/or precipitation from taking place in the flow lines, e.g., the precipitation of paraffins and waxes in produced hydrocarbons. In addition, there is a need for pipeline bundle insulating cement compositions having improved mechanical and elastic properties to withstand the aforementioned stress conditions.

SUMMARY OF THE INVENTION

The present invention provides improved methods of forming highly insulated pipe line bundles which meet the needs described above and overcome the shortcomings of the prior art. The methods basically comprise the steps of filling the space between the outside of the flow lines and the inside of the outer sleeve of a pipeline bundle with a foamed hydraulic cement composition comprised of hydraulic cement, water, a gas and a foaming agent, allowing the hydration reaction between the hydraulic cement and the water in the cement composition to take place and then heating the hydrated cement composition to remove free water therefrom.

The heating step evaporates and removes excess unreacted water in the cement composition and thereby increases the insulating properties of the set cement composition, i.e., the thermal conductivity and heat transfer coefficient of the set cement are lowered. The further steps of venting the outer sleeve and subjecting the cement composition to a vacuum may be utilized during the heating of the composition to further increase the insulating properties of the set cement.

It is, therefore, a general object of the present invention to provide methods of forming improved highly insulated pipeline bundles.

Other and further objects, features and advantages of the present invention will be readily apparent to those skilled in the art upon a reading of the description of preferred embodiments when taken in conjunction with the accompanying drawings.

BRIEF DESCRIPTION OF THE DRAWINGS

FIG. 1 is a side, partially cut away view of a pipeline bundle of the present invention.

FIG. 2 is a cross-sectional view taken along line 2—2 of FIG. 1.

FIG. 3 is a cross-sectional view taken along line 3—3 of FIG. 2.

DESCRIPTION OF PREFERRED EMBODIMENTS

As mentioned, the present invention provides methods of forming insulated pipeline bundles whereby very low heat transfer takes place from the exterior of the bundles to fluids flowing through the interior thereof and vice versa. Pipeline bundles have been used heretofore, and as shown in the drawings, they are basically comprised of at least one, and usually three or more flow lines contained within an outer sleeve. That is, referring to FIGS. 1-3, a typical pipeline bundle 10 is comprised of six flow lines 12A through 12F positioned within an outer protective sleeve 14 by a plurality of support members 16. The support members 16 can take various forms, but they are generally comprised of a frame 18 which rigidly supports the flow lines 12A through 12F in a bundle within the outer sleeve 14. Preferably, the support members 16 each include a plurality of peripheral rollers 20 for facilitating the insertion of the flow line bundle within the outer sleeve 14. The space 22 between the outside of the flow lines and the inside of the outer sleeve is filled with an insulating material which functions to substantially prevent heat transfer from and to the fluids flowing through the flow lines.

In accordance with the present invention, the space 22 of the pipeline bundle 10 is filled with a foamed cement composition comprised of hydraulic cement, water, a gas, a foaming agent, and optionally, a foam stabilizer. After filling, the foamed cement composition is allowed to initially set, i.e., the hydration reaction between the hydraulic cement and the water in the cement composition is permitted to take place. As is well understood by those skilled in the art, after a hydraulic cement is mixed with water and other components, the cement and water react whereby the cement is hydrated and the composition sets into a hard mass. The particular time after mixing that is required for the hydration reaction to take place varies considerably depending on the particular types and quantities of the components in the cement composition. However, the time can be controlled by adding accelerators or retarders to the cement composition which are also well known in the art.

After the hydration of the cement takes place, the hydrated cement composition is heated to evaporate and remove excess unreacted water in the cement composition and thereby increase its insulation properties. The heating of the cement composition can be accomplished by circulating a heated fluid, e.g., steam or hot water, through one or more of the flow lines 12A through 12F. Also, during the heating of the cement composition, the outer sleeve 14 is preferably vented such as by removing plugs (not shown) from threaded connectors 24 spaced along the length of the outer sleeve 14. In addition, a vacuum can optionally be pulled on the cement composition by way of the connectors 24 to increase the evaporation and removal of excess water. Generally, the hydrated foamed cement composition within the space 22 of the pipeline bundle 10 is heated to a temperature in the range of from about 100° F. to about 300° F. for a time period in the range of from about 70 hours to about 170 hours. As mentioned, the heating is preferably accomplished while the outer sleeve is vented to the atmosphere. If the cement composition is also subjected to a vacuum during the heating and venting, it is preferably maintained at a level within the range of from about 0.75 to about 100 millimeters of mercury throughout the duration of the heating step.

When completed, the method of the present invention results in a highly insulated pipeline bundle. That is, the set foamed cement within the outer sleeve of the bundle which is essentially devoid of excess water has a thermal conductivity in the range of from about 0.02 to about 0.35 btu/hr., ft., °F. In addition, the set foamed cement in the pipeline bundle has excellent resiliency and ductility and thereby resists stress failures.

As mentioned above, the foamed cement compositions useful in accordance with this invention are basically comprised of hydraulic cement, water, a gas, a foaming agent and optionally a foam stabilizer. A variety of hydraulic cementitious materials which hydrate to form hard cementitious masses in the presence of water can be utilized in accordance with this invention. Examples of such materials are Portland cement, high alumina cement, slag cement, ASTM Class F fly ash and lime, ASTM Class C fly ash, condensed silica fume and lime, gypsum cement and mixtures of such materials. Of the various hydraulic cements which can be utilized, the most preferred are Portland cements, e.g., Portland cements of the types defined and described in *API Specification For Materials And Testing For Well Cements*, API Specification 10, 5th Edition, dated Jul. 1, 1990 of the American Petroleum Institute.

The water used in the cement composition can be water from any source provided it does not contain an excess of compounds which adversely react with or otherwise affect components in the cement compositions. For example, the water can be fresh water, salt water, brines or seawater. Generally, when mixed the water is present in the compositions of this invention in an amount in the range of from about 15% to about 180% by weight of the hydraulic cement in the compositions.

The gas used to form the cement compositions of this invention is preferably nitrogen or air, with nitrogen being the most preferred. The presence of the gas in the cement composition contributes to the insulation properties of the composition and also provides elasticity to the set foamed cement whereby it resists stress failures as a result of deformation of the pipeline bundle. Generally, it has been found that the amount of gas in the foamed cement composition must be in the range of from about 10% to about 80% by volume of the resulting foamed composition. More preferably, the gas is present in an amount in the range of from about 30% to about 70%, and most preferably, an amount in the range of from about 45% to about 65% by volume of the cement composition.

In order to facilitate foaming and to stabilize the foamed slurry, a foaming agent is preferably included in the cement composition. Suitable foaming agents are surfactants having the formula:

wherein:

a is an integer in the range of from about 5 to about 15;

b is an integer in the range of from about 1 to about 10; and

X is any compatible cation.

A particularly preferred foaming agent is a surfactant of the above type having the formula:

wherein:

a is an integer in the range of from about 6 to about 10. This surfactant is commercially available from Halliburton Energy Services of Duncan, Okla., under the trade designation "CFA-S™."

Another particularly preferred foaming agent of the above mentioned type is a surfactant having the formula:

wherein:

a is an integer in the range of from about 5 to about 15; and b is an integer in the range of from about 1 to about 10. This surfactant is available from Halliburton Energy Services under the trade name "HALLIBURTON FOAM ADDITIVE™."

Another foaming agent which can be utilized in the cement compositions of this invention is comprised of polyethoxylated alcohols having the formula:

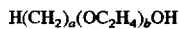

wherein:

a is an integer in the range of from about 10 to about 18; and b is an integer in the range of from about 6 to about 15. A foaming agent of this type is available from Halliburton Energy Services under the trade name "AQF-1™."

Yet another foaming agent which can be used is a sodium salt of alpha-olefinic sulfonic acid (AOS) which is a mixture of compounds of the formulas:

$$X[H(CH_2)_n-C=C-(CH_2)_m SO_3 Na^+]$$

and $$Y[H(CH_2)_p-COH-(CH_2)_q SO_3 Na^+]$$

wherein:

n and m are individually integers in the range of from about 6 to about 16;

p and q are individually integers in the range of from about 7 to about 17; and

X and Y are fractions the sum of which is 1.

A foaming agent of this type is available from Halliburton Energy Services under the trade name "AQF-2™."

Still another surfactant which can be used is an alcohol ether sulfate of the formula:

$$H(CH_2)_a(OC_2H_4)_b SO_3 NH_4^+$$

wherein:

a is an integer in the range of from about 6 to about 10; and b is an integer in the range of from about 3 to about 10.

Generally, the foaming agent utilized is included in a cement composition of this invention in an amount in the range of from about 0.5% to about 10% by weight of water in the composition. When the foaming agent is one of the preferred surfactants described above, it is included in the composition in an amount in the range of from about 2% to about 4% by weight of water therein.

A foam stabilizing agent can also be included in the foamed cement compositions of this invention to enhance the stability of the foamed cement slurry. One such foam stabilizing agent is a compound of the formula:

$$\underset{|}{CH_3O(CH_2CHO)_n}\!-\!R$$
(with R above)

wherein:

R is hydrogen or a methyl radical; and n is an integer in the range of from about 20 to about 200.

A preferred foam stabilizing agent of the above type is a methoxypolyethylene glycol of the formula:

$$CH_3O(CH_2CH_2O)_n H$$

wherein:

n is in the range of from about 100 to about 150.

This foam stabilizing agent is commercially available from Halliburton Energy Services under the trade designation "HALLIBURTON FOAM STABILIZER™."

Another foam stabilizing agent which can be utilized is a compound having the formula:

$$R-CONHCH_2CH_2CH_2N^+(CH_3)_2CH_2CO_2^-$$

wherein:

R is a $C_{10}$ to $C_{18}$ saturated aliphatic hydrocarbon group or an oleyl group or a linoleyl group.

A preferred stabilizing agent of the above type is an amidopropylbetaine of the formula:

$$R-CONHCH_2CH_2CH_2N^+(CH_3)_2CH_2CO_2^-$$

wherein:

R is a coco radical.

This foam stabilizing agent is commercially available from Halliburton Energy Services under the trade designation "HC-2™."

When a foam stabilizing agent is utilized, it is generally included in a cement composition of this invention in an amount in the range of from about 0.25% to about 5% by weight of water utilized. When the foam stabilizing agent is one of the preferred agents described above, it is preferably present in the composition in an amount in the range of from about 1% to about 2% by weight of water.

A particularly preferred foamed cement composition of this invention which sets into a substantially impermeable highly insulative mass is comprised of Portland hydraulic cement; water present in an amount sufficient to form a pumpable slurry; nitrogen gas present in an amount in the range of from about 45% to about 65% by volume of the cement composition to produce a density in the range of from about 6 to about 8.5 pounds per gallon; a foaming agent comprised of the sodium salt of alpha-olefinic sulfonic acid present in an amount in the range of from about 1% to about 2% by weight of water in the composition; and a foam stabilizing agent comprised of an amidopropylbetaine of the formula:

$$R-CONHCH_2CH_2CH_2N^+(CH_3)_2CH_2CO_2^-$$

wherein:

R is a $C_{10}$ to $C_{18}$ saturated aliphatic hydrocarbon group or an oleyl group or a linoleyl group, the foam stabilizing agent being present in an amount in the range of from about 0.5% to about 1.0% by weight of water in the composition.

The foamed cement compositions can include other useful components, additives and fillers which are well known to those skilled in the art. Additional components which impart enhanced elasticity and resilience and low thermal conductivity to the compositions are particularly suitable for use in accordance with this invention. For example, the foamed cement compositions of this invention can include vulcanizable rubber latex therein. The rubber latex is vulcanized at the same approximate time as the cement hydrates to produce a foamed cement composition having high strength, elasticity and resilience. Cement-rubber latex compositions of this type are described in U.S. Pat. No. 5,293,938 issued on Mar. 15, 1994 to Onan et al., which is incorporated herein by reference. Also, the foamed cement composition can include a filler material comprised of hollow ceramic beads which is commercially available from Halliburton Energy Services under the trade designation "SPHERELITE™" which lowers the thermal conductivity of the composition.

In carrying out the methods of this invention, the foamed cement composition can be formed in any conventional manner, e.g., by batch mixing or on the fly. The composition is preferably pumped into the outer sleeve of a section of pipeline bundle after the flow lines have been inserted therein. The heating step is then carried out by circulating a hot fluid, e.g., hot water or steam, through one or more of the flow lines of the bundle section for the time required to remove excess water. As previously mentioned, during the heating, the outer sleeve of the pipeline bundle is preferably vented to the atmosphere or to a vacuum pump whereby a vacuum is pulled on the cement composition. Once the heating and venting steps have been completed, the section of the pipeline bundle is connected to other sections and the resulting pipeline bundle is laid under sea or in another similar location in a conventional manner.

In order to further illustrate the methods of the present invention, the following examples are given.

EXAMPLE 1

Laboratory tests to determine the physical and mechanical properties of foamed cement compositions mixed to densities of 6 and 8 lb/gal were conducted. The cement compositions each consisted of API Class G Portland cement, sufficient water to form a non-foamed base slurry having a density of 15.5 lb/gal, 40% silica flour filler by weight of cement, 2% calcium chloride by weight of cement, 1.5% of HALLIBURTON FOAM ADDITIVE™ by volume of the foamed cement composition, 0.75% HALLIBURTON FOAM STABILIZER™ by volume of the foamed cement composition and sufficient nitrogen gas to produce a foamed cement composition of 6 or 8 lb/gal density.

Test samples of each of the foamed cement compositions were tested for thermal conductivities as follows:

A. After 14 day curing periods at 40° F. and 72° F.
B. After additional wet curing periods of 7 days at 300° F.
C. After additionally being oven dried for 7 days at 300° F.
D. After being dry cured for 3 days at room temperature.
E. After being dry cured for 3 days at room temperature and then vacuum dried for 14 days at room temperature.
F. After being cured 3 days at room temperature followed by 24 hours at 300° F. and 18 hours cooling to room temperature.
G. After being cured 3 days at room temperature followed by 24 hours at 300° F. and 18 hours cooling to room temperature followed by an additional 24 hours at 300° F. and 18 hours cooling to room temperature.
H. After being cured 3 days at room temperature followed by 24 hours at 300° F. and 18 hours cooling to room temperature followed by an additional 24 hours at 300° F. and 18 hours cooling to room temperature followed by a further 24 hours at 300° F. and 18 hours cooling to room temperature.
I. After being oven dried for 7 days at 300° F. followed by room temperature curing for 24 days.

The thermal conductivity measurements were performed using a Halliburton CRD Thermal Conductivity Apparatus, i.e., a precision 2" diameter by 6" length radial flow device and a precision heating device. The foamed cement compositions were placed in an annulus between a sleeve and a heater mandrel in the flow device. The thermal conductivity of the cement was calculated from the temperature drop between the mandrel and outer sleeve and the power input to the heater. The results of the thermal conductivity tests are set forth in Table I below.

TABLE I

Thermal Conductivity (K) Tests

| Curing Procedure[1] | 6 lb/gal Foamed Cement, K in units of BTU/hr, ft, °F. | 8 lb/gal Foamed Cement, K in units of BTU/hr, ft, °F. |
|---|---|---|
| A. @ 40° F. | 0.364 | 0.371 |
| A. @ 72° F. | 0.349 | 0.370 |
| B. | 0.350 | 0.357 |
| C. | 0.145 | 0.164 |
| D. | 0.175 | 0.360 |
| E. | 0.106 | — |
| F. | 0.108 | 0.246 |
| G. | 0.101 | 0.205 |
| H. | — | 0.183 |
| I. | 0.106 | 0.112 |

[1]Letters correspond to the letters in the list of curing procedures set forth above in Example 1.

From Table I it can be seen that the high temperature drying and vacuum drying both produced cement compositions having very low thermal conductivities.

EXAMPLE 2

Samples of the 6 and 8 lb/gal foamed cement compositions described in Example 1 above were tested for compressive strengths. That is, samples were tested after curing at temperatures of 40° F. and 72° F. for 3, 7, 14 and 28 days. Also, samples were tested after being cured for 7 days at 300° F.

The compressive strength tests were conducted in accordance with the procedure described in the above mentioned *API Specification For Materials And Testing For Well Cements*, API Specification 10. The results of these tests are set forth in Table II below.

TABLE II

Compressive Strength Tests

| Curing Period | Cured At 40° F. | | Cured at 72° F. | |
|---|---|---|---|---|
| | 6 lb/gal | 8 lb/gal | 6 lb/gal | 8 lb/gal |
| 3 days | 54 psi | 118 psi | 104 psi | 225 psi |
| 7 days | 72 psi | 160 psi | 166 psi | 430 psi |
| 14 days | 88 psi | 195 psi | 215 psi | 585 psi |
| 28 days | 125 psi | 202 psi | 240 psi | 619 psi |
| | Cured at 300° F. | | Cured at 300° F. | |
| 7 days | 371 psi | 682 psi | 413 psi | 723 psi |

From Table II it can be seen that the foamed cement compositions cured for 7 days at 300° F. had the highest compressive strengths.

EXAMPLE 3

Samples of the foamed cement compositions described in Example 1 above were tested for tensile strengths in accordance with the procedures of ASTM Designations C190-85 and C496. That is, samples cured for 14 days at temperatures of 40° F. and 72° F. were tested for tensile strengths. Also, additional samples were tested for tensile strengths after being cured for 7 days at 300° F. The results of these tests are set forth in Table III below.

TABLE III

Tensile Strength Tests

| Curing Period | Cured At 40° F. | | Cured at 72° F. | |
|---|---|---|---|---|
| | 6 lb/gal | 8 lb/gal | 6 lb/gal | 8 lb/gal |
| 14 days | 12 psi | 36 psi | 29 psi | 66 psi |
| | Cured at 300° F. | | Cured at 300° F. | |
| 7 days | 49 psi | 99 psi | 81 psi | 124 psi |

From Table III it can be seen that the samples cured for 7 days at 300° F. had the highest tensile strength.

EXAMPLE 4

Samples of the foamed cement compositions described in Example 1 above were tested for flexural strengths in accordance with the test procedure described in ASTM Designation C78-84. The tests were run after 14 day curing periods at temperatures of 40° F. and 72° F. Additional samples were tested for flexural strengths after curing for 7 days at 300° F. The results of these tests are given in Table IV below.

TABLE IV

| | Flexural Strength Tests | | | |
|---|---|---|---|---|
| | Cured At 40° F. | | Cured at 72° F. | |
| Curing Period | 6 lb/gal | 8 lb/gal | 6 lb/gal | 8 lb/gal |
| 14 days | 13 psi | 23 psi | 14 psi | 34 psi |
| | Cured at 300° F. | | Cured at 300° F. | |
| 7 days | 55 psi | 175 psi | 65 psi | 180 psi |

From Table IV it can be seen that the samples cured for 7 days at 300° F. had the greatest flexural strengths.

EXAMPLE 5

Samples of the foamed cement compositions described in Example 1 above were tested for shear bond strengths in accordance with standard cement shear bond test procedures. That is, each shear bond strength test was performed by first placing the foamed cement composition test samples between two pieces of pipe. The test samples were then cured as indicated below. After curing, a load was applied to the inside pipe to force it to move within the set cement. The total load in pounds was then divided by the surface area of the inside pipe which was in contact with the cement to obtain the shear bond strength in psi. Samples were tested after being cured for 14 days at temperatures of 40° F. and 72° F. Additional samples cured for 7 days at 300° F. were also tested. The results of these tests are set forth in Table V below.

TABLE V

| | Shear Bond Tests | | | |
|---|---|---|---|---|
| | Cured At 40° F. | | Cured at 72° F. | |
| Curing Period | 6 lb/gal | 8 lb/gal | 6 lb/gal | 8 lb/gal |
| 14 days | 19 psi | 35 psi | 34 psi | 63 psi |
| | Cured At 300° F. | | Cured at 300° F. | |
| Curing Period | 6 lb/gal | 8 lb/gal | 6 lb/gal | 8 lb/gal |
| 7 days | 51 psi | 93 psi | 76 psi | 140 psi |

From Table V it can be seen that the samples cured for 7 days at 300° F. had the greatest shear bond strengths.

EXAMPLE 6

Samples of the foamed cement compositions described in Example 1 were tested for thermal expansion in accordance with the procedure described API Specification 10. The samples were tested after being cured for 14 days at temperatures of 40° F. and 72° F. Additional samples cured for 7 days at 300° F. were also tested. The results of these tests are set forth in Table VI below.

TABLE VI

| | Thermal Expansion Tests | | | |
|---|---|---|---|---|
| | Cured At 40° F. | | Cured at 72° F. | |
| Curing Period | 6 lb/gal | 8 lb/gal | 6 lb/gal | 8 lb/gal |
| 3 days | 0% | 0% | 0% | 0% |
| 7 days | 0% | 0% | 0% | 0% |
| 14 days | 0% | 0% | 0% | 0% |
| | Cured At 300° F. | | Cured at 300° F. | |
| Curing Period | 6 lb/gal | 8 lb/gal | 6 lb/gal | 8 lb/gal |
| 7 days | 0.22% | 0.2% | 0.16% | 0.14% |

From Table VI it can be seen that the samples cured for 7 days at 300° F. had low thermal expansion.

EXAMPLE 7

Samples of the foamed cement compositions described in Example 1 were tested for liquid permeability in accordance with the procedure described API Specification 10. Samples were tested after being cured for 14 days at temperatures of 40° F. and 72° F. The results of these tests are set forth in Table VII below.

TABLE VII

| | Liquid Permeability Tests | |
|---|---|---|
| Curing Period | Cured At 40° F. 6 lb/gal | Cured at 72° F. 8 lb/gal |
| 14 days | 469.49 millidarcies | 0.7934 millidarcies |

From Table VII it can be seen that the samples had low permeabilities.

EXAMPLE 8

Samples of the foamed cement compositions described in Example 1 above were tested for elastic moduli in accordance with the procedures of ASTM Designation 3148-86. Samples were tested after being cured for 14 days at temperatures of 40° F. and 72° F. The results of these tests are set forth in Table VIII below.

TABLE VIII

| | Elastic Moduli Tests (Young's Modulus of Elasticity) | |
|---|---|---|
| Curing Period | Cured At 40° F. 6 lb/gal | Cured at 72° F. 8 lb/gal |
| 14 days | $0.071 \times 10^6$ psi | $0.144 \times 10^6$ psi |

From Table VIII it can be seen that the Young's modulus of elasticity for the 6 lb/gal foamed cement was $0.071 \times 10^6$ psi as compared to non-foamed cements which have Young's moduli of about $3 \times 10^6$ psi and steel which has a modulus of about $30 \times 10^6$ psi.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of forming a highly insulated pipeline bundle made up of at least one flow line positioned within a continuous larger diameter outer sleeve comprising the steps of:
   filling the space between the outside of said flow line and the inside of said outer sleeve with a foamed cement composition comprised of hydraulic cement, water, a gas and a foaming agent;
   allowing the hydration reaction between said hydraulic cement and said water in said cement composition to take place; and then
   heating said hydrated cement composition to evaporate and remove excess water in said cement composition and thereby increase the insulation properties of said cement composition, wherein said cement composition is heated to a temperature in the range of from about 100° F. to about 300° F. for a time period in the range of from about 70 hrs. to about 170 hrs.

2. The method of claim 1 which further comprises the step of venting said outer sleeve during said heating step.

3. The method of claim 1 which further comprises the step of subjecting said cement composition to a vacuum.

4. The method of claim 1 wherein said hydraulic cement is selected from the group consisting of Portland cement, high alumina cement, slag cement, ASTM Class F fly ash and lime, ASTM Class C fly ash, condensed silica fume and lime, gypsum cement and mixtures of such materials.

5. The method of claim 1 wherein said water is selected from the group consisting of fresh water, salt water, brines and seawater, and is present in said cement composition in an amount in the range of from about 15% to about 180% by weight of hydraulic cement therein.

6. The method of claim 1 wherein said gas is selected from the group consisting of air and nitrogen, and is present in said cement composition in an amount in the range of from about 10% to about 80% by volume of said cement composition.

7. The method of claim 1 wherein said foaming agent is the sodium salt of alpha-olefinic sulfonic acid and is present in said cement composition in an amount in the range of from about 1% to about 2% by weight of water therein.

8. The method of claim 1 wherein said foamed cement composition further comprises a foam stabilizing agent comprised of an amidopropylbetaine of the formula:

wherein:
R is a $C_{10}$ to $C_{18}$ saturated aliphatic hydrocarbon group or an oleyl group or a linoleyl group,
said foam stabilizer being present in an amount in the range of from about 0.5% to about 1.0% by weight of water in said composition.

9. The method of claim 1 wherein said foamed cement composition further comprises a vulcanizable rubber latex which is caused to vulcanize as said hydration reaction between said hydraulic cement and said water takes place.

10. The method of claim 1 wherein said foamed cement composition further comprises a filler of hollow ceramic beads.

11. A method of forming a highly insulated pipeline bundle made up of at least one flow line positioned within a continuous larger diameter outer sleeve comprising the steps of:
   pumping a foamed cement composition into the space between the outside of said flow line and the inside of said outer sleeve, said foamed cement composition being comprised of Portland hydraulic cement, water, a gas and a foaming agent;
   allowing the hydration reaction between said hydraulic cement and said water in said cement composition to take place; and then
   heating said hydrated cement composition while venting said outer sleeve to the atmosphere to evaporate and remove excess water in said cement composition and thereby increase the insulation properties of said cement composition, wherein said cement composition is heated to a temperature in the range of from about 100° F. to about 300° F. for a time period in the range of from about 70 hrs. to about 170 hrs.

12. The method of claim 11 which further comprises the step of subjecting said cement composition to a vacuum during said heating and venting step.

13. The method of claim 12 wherein said water is selected from the group consisting of fresh water, salt water, brines and seawater, and is present in said cement composition in an amount in the range of from about 15% to about 180% by weight of hydraulic cement therein.

14. The method of claim 13 wherein said gas is selected from the group consisting of air and nitrogen, and is present in said cement composition in an amount in the range of from about 10% to about 80% by volume of said cement composition.

15. The method of claim 14 wherein said foaming agent is the sodium salt of alpha-olefinic sulfonic acid and is present in said cement composition in an amount in the range of from about 1% to about 2% by weight of water therein.

16. The method of claim 15 wherein said foamed cement composition further comprises a foam stabilizing agent comprised of an amidopropylbetaine of the formula:

wherein:
R is a $C_{10}$ to $C_{18}$ saturated aliphatic hydrocarbon group or an oleyl group or a linoleyl group,
said foam stabilizer being present in an amount in the range of from about 0.5% to about 1.0% by weight of water in said composition.

17. A method of forming a highly insulated pipeline bundle made up of at least one flow line positioned within a larger diameter outer sleeve comprising the steps of:
   pumping a foamed cement composition into the space between the outside of said flow line and the inside of said outer sleeve, said foamed cement composition being comprised of Portland hydraulic cement, fresh water present in said composition in an amount in the range of from about 15% to about 180% by weight of hydraulic cement therein, nitrogen present in said composition in an amount in the range of from about 10% to about 80% by volume of said composition, a foaming agent comprising the sodium salt of alpha-olefinic sulfonic acid present in said composition in an amount in the range of from about 1% to about 2% by weight of water therein and a foam stabilizer comprising an amidopropylbetaine of the formula:

wherein:
R is a $C_{10}$ to $C_{18}$ saturated aliphatic hydrocarbon group or an oleyl group or a linoleyl group, said foam stabilizer being present in said composition in an amount in the range of from about 0.5% to about 1.0% by weight of water therein;

allowing the hydration reaction between said hydraulic cement and said water in said cement composition to take place; and then heating said hydrated cement composition while venting said outer sleeve to evaporate and remove excess water in said cement composition and thereby increase the insulation properties of said cement composition, said cement composition being heated to a temperature in the range of from about 100° F. to about 300° F. for a time period in the range of from about 70 hrs. to about 170 hrs.; and subjecting said cement composition to a vacuum during said heating and venting step.

18. The method of claim 17 wherein the resulting hydrated cement composition has a thermal conductivity in the range of from about 0.02 Btu/hr., ft., °F. to about 0.35 Btu/hr., ft., °F. after being heated and vented and subjected to said vacuum.

19. A method of forming a highly insulated pipeline bundle made up of at least one flow line positioned within a continuous larger diameter outer sleeve comprising the steps of:

filling the space between the outside of said flow line and the inside of said outer sleeve with a foamed cement composition comprised of hydraulic cement, water, a gas and a foaming agent;

allowing the hydration reaction between said hydraulic cement and said water in said cement composition to take place; and then heating said hydrated cement composition to evaporate and remove excess water in said cement composition and thereby increase the insulation properties of said cement composition; and venting said outer sleeve during said heating step.

20. The method of claim 19 which further comprises the step of subjecting said cement composition to a vacuum.

21. The method of claim 19 wherein said hydraulic cement is selected from the group consisting of Portland cement, high alumina cement, slag cement, ASTM Class F fly ash and lime, ASTM Class C fly ash, condensed silica fume and lime, gypsum cement and mixtures of such materials.

22. The method of claim 19 wherein said water is selected from the group consisting of freshwater, salt water, brines and seawater, and is present in said cement composition in an amount in the range of from about 15% to about 180% by weight of hydraulic cement therein.

23. The method of claim 19 wherein said gas is selected from the group consisting of air and nitrogen, and is present in said cement composition in an amount in the range of from about 10% to about 80% by volume of said cement composition.

24. The method of claim 19 wherein said foaming agent is the sodium salt of alpha-olefinic sulfonic acid and is present in said cement composition in an amount in the range of from about 1% to about 2% by weight of water therein.

25. The method of claim 19 wherein said foamed cement composition further comprises a foam stabilizing agent comprised of an amidopropylbetaine of the formula:

$$R-CONHCH_2CH_2CH_2N^+(CH_3)_2CH_2CO_2^-$$

wherein:

R is a $C_{10}$ to $C_{18}$ saturated aliphatic hydrocarbon group or an oleyl group or a linoleyl group, said foam stabilizer being present in an amount in the range of from about 0.5% to about 1.0% by weight of water in said composition.

26. The method of claim 19 wherein said foamed cement composition further comprises a vulcanizable rubber latex which is caused to vulcanize as said hydration reaction between said hydraulic cement and said water takes place.

27. The method of claim 19 wherein said foamed cement composition further comprises a filler of hollow ceramic beads.

28. A method of forming a highly insulated pipeline bundle made up of at least one flow line positioned within a continuous larger diameter outer sleeve comprising the steps of:

filling the space between the outside of said flow line and the inside of said outer sleeve with a foamed cement composition comprised of hydraulic cement, water, a gas and a foaming agent;

allowing the hydration reaction between said hydraulic cement and said water in said cement composition to take place; and then heating said hydrated cement composition to evaporate and remove excess water in said cement composition and thereby increase the insulation properties of said cement composition, and subjecting said cement composition to a vacuum.

29. The method of claim 28 wherein said hydraulic cement is selected from the group consisting of Portland cement, high alumina cement, slag cement, ASTM Class F fly ash and lime, ASTM Class C fly ash, condensed silica fume and lime, gypsum cement and mixtures of such materials.

30. The method of claim 28 wherein said water is selected from the group consisting of fresh water, salt water, brines and seawater, and is present in said cement composition in an amount in the range of from about 15% to about 180% by weight of hydraulic cement therein.

31. The method of claim 28 wherein said gas is selected from the group consisting of air and nitrogen, and is present in said cement composition in an amount in the range of from about 10% to about 80% by volume of said cement composition.

32. The method of claim 28 wherein said foaming agent is the sodium salt of alpha-olefinic sulfonic acid and is present in said cement composition in an amount in the range of from about 1% to about 2% by weight of water therein.

33. The method of claim 28 wherein said foamed cement composition further comprises a foam stabilizing agent comprised of an amidopropylbetaine of the formula:

$$R-CONHCH_2CH_2CH_2N^+(CH_3)_2CH_2CO_2^-$$

wherein:

R is a $C_{10}$ to $C_{18}$ saturated aliphatic hydrocarbon group or an oleyl group or a linoleyl group, said foam stabilizer being present in an amount in the range of from about 0.5% to about 1.0% by weight of water in said composition.

34. The method of claim 28 wherein said foamed cement composition further comprises a vulcanizable rubber latex which is caused to vulcanize as said hydration reaction between said hydraulic cement and said water takes place.

35. The method of claim 28 wherein said foamed cement composition further comprises a filler of hollow ceramic beads.

* * * * *